_United States Patent Office_  
3,270,094  
Patented August 30, 1966

3,270,094  
THIOPHOSPHORIC, -PHOSPHONIC AND -PHOSPHINIC ACID ESTERS  
Hans-Gerd Schicke, Wuppertal-Elberfeld, Germany, assignor to Farbenfabriken Bayer Aktiengesellschaft, Leverkusen, Germany, a German corporation  
No Drawing. Filed Apr. 9, 1963, Ser. No. 271,568  
Claims priority, application Germany, Apr. 18, 1962, F 36,581  
11 Claims. (Cl. 260—944)

The present invention relates to and has as its objects new and useful insecticidally active, phosphorus and sulphur containing compouds as well as processes for the production thereof.

More specifically this invention relates to thiol- and thionothiol-phosphoric-, -phosphonic- or -phosphinic acid esters of the general formula

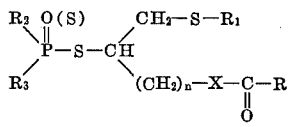

In this formula R and $R_1$ stand for lower alkyl radicals e.g. methyl, ethyl and butyl groups, X is an oxygen atom or an imino group, the index $n$ means zero or 1, whilst $R_2$ and $R_3$ denote the same or different lower alkyl or lower alkoxy radicals, preferably with 1 to 4 carbon atoms.

It has been known for a long time that sulphur halides, especially sulphur dichloride, can be added on to unsaturated compounds. In recent times Russian authors have described the addition of sulphur dichloride, e.g. onto dimethyl-acrylic acid (cf. I. L. Knunjanz, M. G. Linjkowa and P. G. Ignatjenok, Nachr. d. Akad. d. Wiss. d. USSR, 1955, pages 54–61, cf. also M. G. Linjkowa, N. D. Patrina and I. L. Knunjanz, Ber. d. Akad. d. Wiss. d. USSR 127 (1959), pages 799–802). In the same publication the addition of alkysulphenic acid chlorides onto dimethyl-acrylic acid is also mentioned.

It is also already known, that alkyl sulphenic acid chlorides can be added onto α,β-unsaturated carboxylic acid compounds (cf. Belgian patent specifications No. 616, 998 and No. 618,247).

In accordance with the present invention it has now been found that alkyl sulphenic acid chlorides can be readily added onto lower alkanoic acid vinyl esters, allyl esters or corresponding amides. Compounds of the general structure as given below are then obtained according to the following reaction scheme:

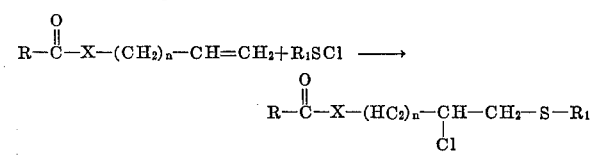

In these formulae the symbols R and $R_1$ have the same significance as given above.

In these new condensation products the chlorine atom can be readily reacted with salts of O,O-dialkyl-thiol- or -thionothiolphosphoric acid esters or alkyl-thiol- or -thionothiolphosphonic acid-O-alkyl esters or with the corresponding dialkyl-thiol- or -thionothiolphosphinic acid salts. Compounds are then obtained of the general constitution

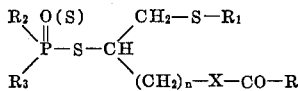

In this formula the radicals R, $R_1$, $R_2$, $R_3$, X and $n$ have the same significance as indicated before.

The exchange of the chlorine atom for the radicals of the said thiol- or thionothiol-phosphoric, -phosphonic and -phosphinic acids is expediently performed at somewhat elevated temperatures and in suitable inert organic solvents. As solvents acetonitrile, methyl ethyl ketone, methyl butyl ketone and others have proved to be suitable. Especially advantageous working temperatures are 50 to 80° C.

The new products obtained in this way are mostly water-soluble oils, which may to some extent be distilled in high vacuum without decomposition. Some of the compounds are solid at room temperature.

The new compounds of the present invention very effectively kill insects like aphids, spider mites, caterpillars, flies etc. They distinguish themselves especially by a good contact-insecticidal activity, in part also by an ovicidal effect and mostly also by an outstanding systemic action. At the same time they have an activity on eating insects such as caterpillars. Most surprisingly they are of remarkable low toxicity against warm-blooded creatures. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones especially lower ketones such as acetone or methyl ethyl ketone, liquid hydrocarbons and the like, The new compounds may furthermore be used in combination with each other or with known insecticides, fertilizers etc.

As examples for the special utility the inventive compounds of the formulae

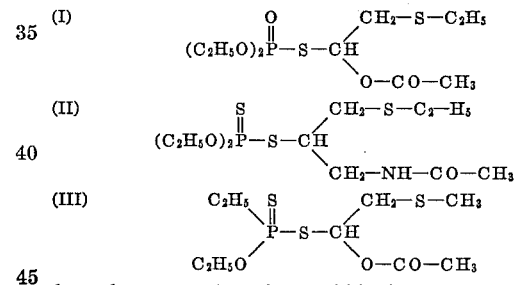

have been tested against aphids (compounds I and III), spider mites (compounds I, II and III), caterpillars (compounds II and III) and flies (compound III).

Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs.

The tests have been carried out as follows:

(a) Against aphids (species _Doralis fabae_): heavily infested bean plants (_Vicia faba_) have been sprayed drip wet with solutions as prepared above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| I | 0.001 | 80 |
| III | 0.01 | 100 |

(b) Against spider mites: Bean plants (*Phaseolus vulgaris*) of about 15 inches height are sprayed drip wet with solutions as prepared above and in a concentration as shown below. The bean plants have infested heavily with the two-spotted spider (species *Tetranychus telarius*). Evaluation has been carried out after 24 hours, 48 hours, and 8 days. The following results have been obtained:

| Compound | Aqueous concentration (in percent active ingredient/water) | Killing rate (in percent) |
|---|---|---|
| I | 0.01 | 90 |
| II | 0.01 | 90 |
| III | 0.01 | 100 |

(c) Against caterpillars of the type diamondback moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| II | 0.1 | 100 |
| III | 0.1 | 100 |

(d) Against flies: about 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate (in percent) |
|---|---|---|
| III | 0.01 | 100 |

The following examples are given for the purpose of illustrating the invention:

*Example 1a*

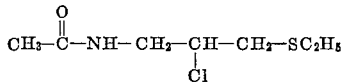

149 g. of acetic acid-N-allyl amide are dissolved in 700 cc. of carbon tetrachloride. At 0° C. 1.5 mols of ethylsulphenic acid chloride dissolved in 200 cc. of carbon tetrachloride are added dropwise to this solution. Subsequently the mixture is stirred at 20° C. for one hour, followed by washing with a little water and removal of the solvent in a vacuum. In this way there are obtained 176 g. (60% of the theoretical yield) of the acetic acid-N-(2-chloro-3-ethylmercapto)-propylamide.

*Example 1b*

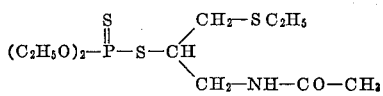

41 g. (0.2 mol) of the O,O-diethyl-thionothiolphosphoric acid ammonium salt are dissolved in 200 cc. of acetonitrile. At 70° C. there are added dropwise to this solution 39 g. (0.2 mol) of acetic acid-N-(2-chloro-3-ethylmercapto)-polyamide, dissolved in 50 cc. of acetonitrile. After stirring for one hour at 70° C. the reaction mixture is cooled to room temperature and then poured into 300 cc. of ice water. The separated oil is taken up in methylene chloride, the methylene chloride solution is washed several times with water and then dried over sodium sulphate. After removing the solvent under reduced pressure 39 g. (59% of the theoretical yield) of the compound of the above constitution in the form of a slightly yellow, water-insoluble oil are obtained.

*Analysis.*—Calculated for a molecular weight of 345: P, 8.9%; S, 27.6%; N, 4.0%. Found: P, 8.9%; S, 27.9%; N, 4.2%.

Spider mites are killed 90% by 0.01% solutions of the new ester. 0.1% solutions show a 100% ovicidal action against the eggs of the red spider, and likewise a 100% system effect against aphids. Caterpillars are completely destroyed by 0.1% solutions.

In a similar way there are obtained from 39 g. of acetic acid-N-(2-chloro-3-ethylmercapto)-propylamide and 35 g. of the O,O-dimethyl-thionothiolphosphoric acid ammonium salt, 52 g. (82% of the theoretical yield) of the new compound of the following constitution:

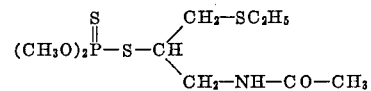

0.01% solutions of the ester kill spider mites 90% and 0.1% solutions show a 100% effect against caterpillars.

From 36 g. of acetic acid-N-(2-chloro-3-methylmercapto)-propylamide and 37.4 g. of the O,O-diethyl-thialphosphoric acid ammonium salt, 52 g. (82.5% of the theoretical yield) of the following compound are obtained in the same manner:

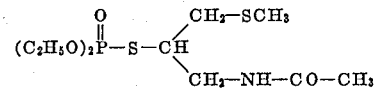

Spider mites are killed with certainty by 0.1% solutions of the ester. The systemic action of 0.1% solutions of the compound against aphids is 100%.

In the same way from 36 g. of the acetic acid-N-(2-chloro-3-methylmercapto)-propylamide and 33 g. of the dimethylthionothiolphosphinic acid potassium salt, there are obtained 35 g. (65% of the theoretical yield) of the new compound of the following formula:

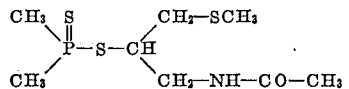

of M.P. 67° C. (after recrystallization from a benzene-ligroin-mixture).

Beetles and spider mites are 100% destroyed by 0.1% solutions of the ester. The product is 100% systemically active in 0.1% solutions against aphids.

*Example 2a*

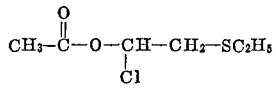

72 g. (2 mols) of vinyl acetate are dissolved in 400 cc. of carbon terachloride. To this solution 2 mols of ethylsulphenic acid chloride dissolved in 200 cc. carbon tetrachloride are added dropwise. Subsequently the reaction mixture is stirred for one hour, then washed with water and the organic layer dried with sodium sulphate. After removal of the solvent, the residue is distilled fractionally. There are obtained 295 g. (81% of the theoretical yield) of acetic acid-(1-chloro-2-ethylmercapto)-ethyl ester of B.P. 92 to 94° C. at 8 mm. Hg.

*Example 2b*

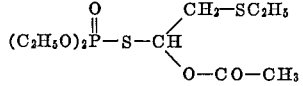

56 g. (0.25 mol) of the ammonium salt of O,O-diethyl-thiolphosphoric acid are dissolved in 50 cc. acetonitrile. 55 g. of acetic acid-(1-chloro-2-ethylmercapto)-ethyl ester are added dropwise at 80° C. to this solution. The mixture is stirred for a further 2 hours at 70 to 80° C., then cooled to room temperature and poured into 200 cc. of ice water. The separated oil is taken up in methylene chloride and the methylene chloride solution is washed with water and then dried over sodium sulphate. After fractional distillation there are obtained 39 g. (41% of the theoretical yield) of the new compound of B.P. 125 to 127° C. at 0.12 mm. Hg.

0.001% solutions of the ester kill aphids 80%. Spider mites are destroyed 90% by 0.01% solutions.

In an analogous manner there are obtained from 55 g. of acetic acid-(1-chloro-2-ethylmercapto)-ethyl ester and 50 g. of dimethylthionothiolphosphinic acid potassium salt, 76 g. (93% of the theoretical yield) of the following compound:

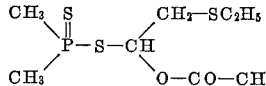

of B.P. 120 to 122° C. at 0.01 mm. Hg. Flies and aphids are 100% killed by 0.1% solutions of the ester.

From 42 g. of acetic acid-(1-chloro-2-methylmercapto)-ethyl ester (B.P. 84° C. at 6 mm. Hg) and 52 g. of ethyl-O-ethylthionothiolphosphonic acid potassium salt, there are obtained 49 g. (65% of the theoretical yield) of the compound of the following constitution:

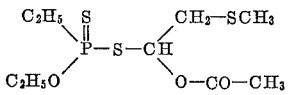

of B.P. 110° C. at 0.01 mm. Hg.

Spider mites, aphids and flies are 100% killed by 0.01% solutions and caterpillars are completely detroyed by 0.1% solutions of the ester.

*Example 3a*

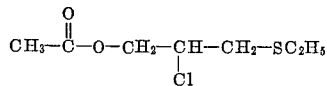

To a solution of 150 g. (1.5 mols) of allyl acetate in 500 cc. of carbon tetrachloride, 144 g. ethylsulphenic acid chloride dissolved in 400 cc. of carbon tetrachloride are added dropwise with stirring at 10° C. Subsequently the reaction mixture is further stirred for 15 minutes and then washed twice with water. The organic layer is dried over sodium sulphate, the solvent distilled off and the residue is fractionated. There are obtained 238 g. (corresponding to 81% of the theoretical yield) of the acetic acid(2-chloro-3-ethylmercapto)-propyl ester of B.P. 106° C. at 7 mm. Hg.

*Example 3b*

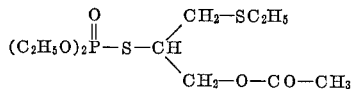

29.4 g. (0.15 mol) of acetic acid-(2-chloro-3-ethylmercapto)-propyl ester are dissolved in 50 cc. of acetonitrile. At 70 to 80° C. this solution is added dropwise to a solution of 28 g. of the ammonium salt of O,O-diethylthiolphosphoric acid in 250 cc. of acetonitrile. The mixture then is stirred for one hour at 70 to 80° C., cooled to room temperature, the resulting salts are filtered off, and from the filtrate the acetonitrile is removed by distillation. The residue is taken up in methylene chloride and the methylene chloride solution washed with a little water. After drying of the organic layer over sodium sulphate, the solvent is distilled off. There are obtained 42 g. (85% of the theoretical yield) of a yellow oil, which can not be distilled without decomposition even under highly reduced pressure.

Aphids are completely desctroyed by 0.1% solutions of the ester and spider mites are killed to the extent of 90% even by 0.01% solutions.

I claim:
1. A compound of the formula

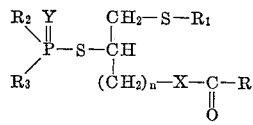

wherein R and $R_1$ stand for lower alkyl having up to 4 carbon atoms, $R_2$ and $R_3$ stand independently for members selected from the group consisting of lower alkyl having up to 4 carbon atoms and lower alkoxy having up to 4 carbon atoms, X stands for a member selected from the group consisting of oxygen and imino, Y stands for oxygen or sulfur and $n$ is an integer of from 0 to 1.

2. The compound according to claim 1 wherein $R_2$ and $R_3$ stand for lower alkoxy and X stands for oxygen.

3. The compound according to claim 1 wherein $R_2$ and $R_3$ stand for lower alkoxy and X stands for imino.

4. The compound according to claim 1 wherein $R_2$ stands for lower alkyl, $R_3$ stands for lower alkoxy and X stands for oxygen.

5. The compound according to claim 1 wherein $R_2$ stands for lower alkyl, $R_3$ stands for lower alkoxy and X stands for imino.

6. The compound according to claim 1 wherein $R_2$ and $R_3$ stand for lower alkyl and X stands for oxygen.

7. The compound according to claim 1 wherein $R_2$ and $R_3$ stand for lower alkyl and X stands for imino.

8. The compound of the following formula

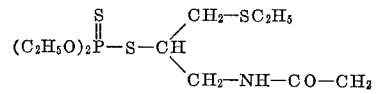

9. The compound of the following formula

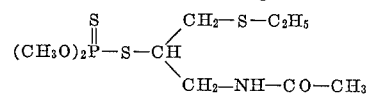

10. The compound of the following formula

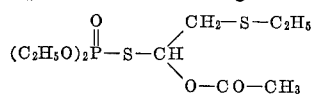

11. The compound of the following formula

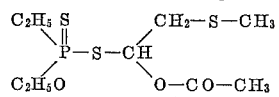

References Cited by the Examiner
UNITED STATES PATENTS 2,852,514   9/1958   Schrader et al. _ 260—461.112 X
2,959,516   11/1960  Sallmann _____ 260—461.112 X CHARLES B. PARKER, *Primary Examiner.*

F. M. SIKORA, *Assistant Examiner.*

UNITED STATES PATENT OFFICE
CERTIFICATE OF CORRECTION

Patent No. 3,270,094                      August 30, 1966

Hans-Gerd Schicke

It is hereby certified that error appears in the above numbered patent requiring correction and that the said Letters Patent should read as corrected below.

Column 6, lines 40 to 42, for that portion of the formula reading "$CH_2-NH-CO-CH_2$" read -- $CH_2-NH-CO-CH_3$ --.

Signed and sealed this 22nd day of August 1967.

(SEAL)
Attest:

ERNEST W. SWIDER                      EDWARD J. BRENNER
Attesting Officer                           Commissioner of Patents